US009350968B1

(12) United States Patent  
Masterson

(10) Patent No.: US 9,350,968 B1  
(45) Date of Patent: May 24, 2016

(54) ENHANCED DIGITAL VIDEO RECORDING USING VIDEO TRANSCODING

(71) Applicant: Freescale Semiconductor, Inc., Austin, TX (US)

(72) Inventor: Anthony D. Masterson, Saratoga, CA (US)

(73) Assignee: Freescale Semiconductor, Inc., Austin, TX (US)

( * ) Notice: Subject to any disclaimer, the term of this patent is extended or adjusted under 35 U.S.C. 154(b) by 8 days.

(21) Appl. No.: 14/296,228

(22) Filed: Jun. 4, 2014

(51) Int. Cl.  
*H04N 9/80* (2006.01)  
*H04N 9/79* (2006.01)  
*H04N 5/913* (2006.01)  
*G11B 27/19* (2006.01)

(52) U.S. Cl.  
CPC .................. *H04N 9/79* (2013.01); *G11B 27/19* (2013.01); *H04N 5/913* (2013.01)

(58) Field of Classification Search  
USPC .......................................... 386/248, 258–260  
See application file for complete search history.

(56) References Cited

U.S. PATENT DOCUMENTS

| 6,970,564 | B1 * | 11/2005 | Kubota et al. | 380/210 |
| 2005/0190872 | A1 * | 9/2005 | Seong et al. | 375/354 |
| 2010/0114816 | A1 * | 5/2010 | Kiilerich | 707/610 |
| 2012/0140018 | A1 * | 6/2012 | Pikin et al. | 348/14.02 |
| 2013/0152121 | A1 * | 6/2013 | Bartel-Kurz et al. | 725/31 |

* cited by examiner

Primary Examiner — Nigar Chowdhury

(57) ABSTRACT

An enhanced digital video recording device is provided to enhance digital video recording performance, features and user experience. The recording device has a processor and a storage unit, where the storage unit has multiple computer memory units, such as SSDs, HDDs, and video transcoder for transcoding video data in a data stream. The video transcoder interacts with a controller of the storage module to differentiate between video data packets and non-video data packets of the data stream based on one or more determination criteria. Responsive to data stream being video data stream, the video transcoder transcodes the data packets of the data stream. Responsive to the data packets being encrypted, the video transcoder obtains and/or generates encryption keys and decrypts the data packets. The video transcoder also periodically provides feedback data generated from transcoding process to enhance the transcoding operations.

20 Claims, 6 Drawing Sheets

ENHANCED DIGITAL VIDEO RECORDING USING VIDEO TRANSCODING

BACKGROUND

1. Field of Art

The disclosure generally relates to data compression and storage, more particularly, to improving digital video recording using video transcoding within data storage devices.

2. Description of the Related Art

A reliable and functional storage device is important for many digital data storage and monitoring systems. A digital video recorder (DVR) is a consumer electronic device that records video data (and its associated audio data) in a digital format to a storage device. The widely used storage devices by DVRs include hard disk drives (HDDs), flash memory cards, USB drives and other local or networked storage devices. The HDD is traditionally the main storage device for DVRs with data recorded by the drive heads onto a collection of disks inside an HDD. However, using a spinning hard drive for DVR storage has many drawbacks, including requirements of high power, a large container to hold the disk drive and a fan for cooling the drive in addition to noise and vulnerability to damage.

An alternative for DVR storage is Solid State Drive (SSD), which requires no moving parts, no moving heads and no spinning discs versus HDDs while offering equivalent or superior storage services for DVRs. For example, SSDs support energy savings and can save up to 99% of the idle power required by HDDs. SSDs also significantly cut data access time required by HDDs because SSDs do not require waiting time for a disk platter to reach full speed and for the disk head to move to the required read/write point. While offering superior technical advantages, SSDs are generally more expensive than HDDs.

Existing SSD data compression solutions are known to employ lossless video compression that fail to support real time video processing and do not provide video transcoding functionalities at all. Therefore, combining video processing capabilities within digital video recording devices, such as video transcoding within SSDs or hybrid SSD and HDD, enhances the digital recording devices' performance and user experiences.

BRIEF DESCRIPTION OF DRAWINGS

The disclosed embodiments have other advantages and features that will be more readily apparent from the detailed description, the appended claims, and the accompanying figures (or drawings). A brief introduction of the figures is below.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview—Enhanced Digital Video Recording Using Video Transcoding One embodiment as disclosed embeds a video transcoder within a storage module (e.g., HDD or SSD) of a digital video recording device (e.g., a DVR) to provide enhanced digital video recording features and user experience. The video transcoder interacts with a controller of the storage module to differentiate between video data packets and non-video data packets of input data. In one embodiment, a processor of the digital video recording device obtains the data type information associated with data packets of the input data. Responsive to input data being video, the processor instructs the video transcoder to transcode the data packets and stores the transcoded data packets in the storage units of the digital video recording device.

In another embodiment, the video transcoder of the digital video recording device determines the data type of the input data in real time (i.e., on the fly) based on one or more determination criteria. Responsive to the input data being video, the video transcoder transcodes the input data before the controller of the digital video recording device storing the input data into computer memory storage units of the digital video recording device. In response to the input data packets being encrypted, the video transcoder obtains and/or generates one or more encryption keys and decrypts the data packets. The video transcoder also periodically provides feedback data generated from transcoding process to enhance the transcoding operations.

Computing Machine Architecture

Figure 1:
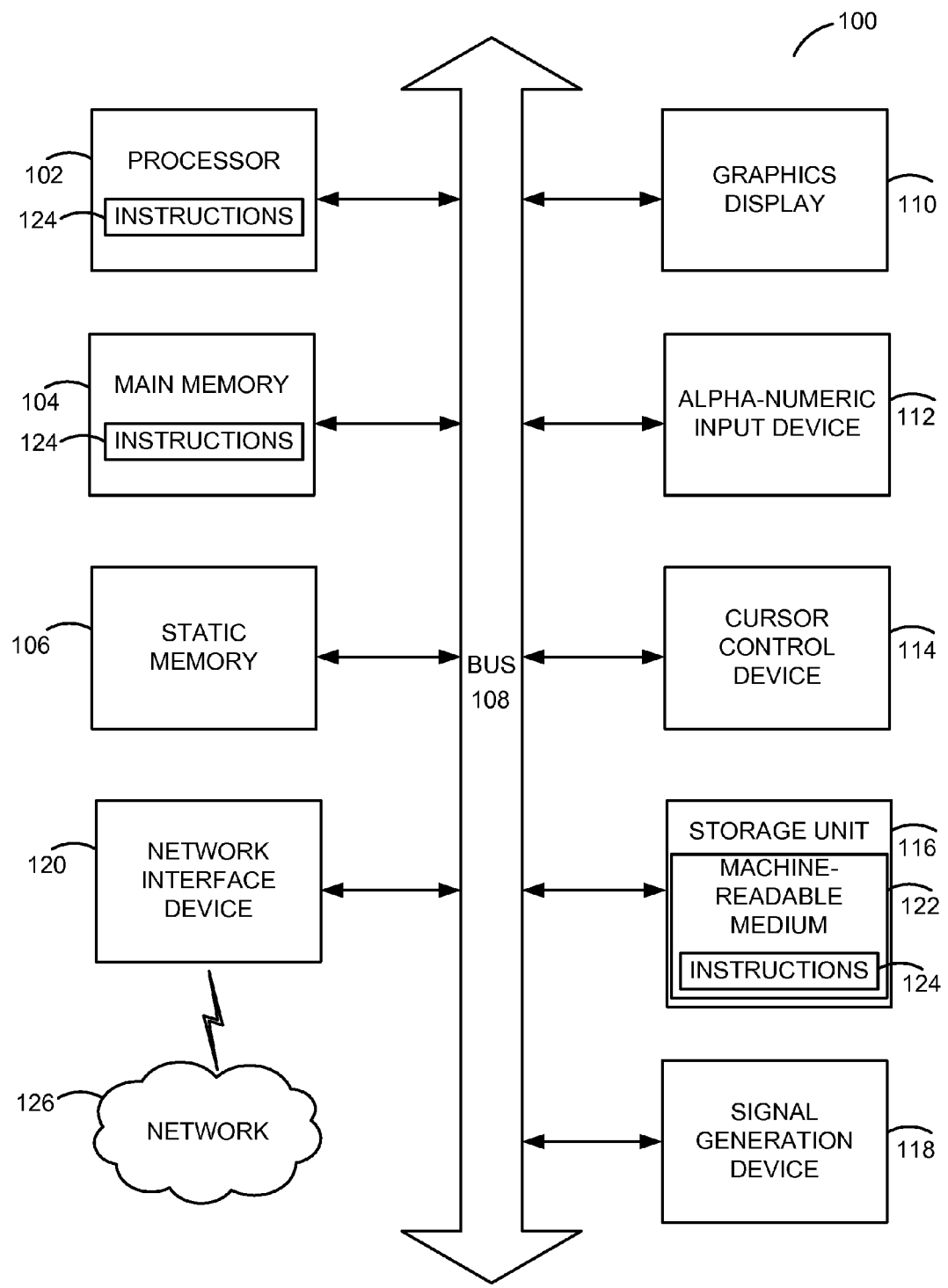
FIG. 1 illustrates one embodiment of components of an example machine able to read instructions from a machine-readable medium and execute them in a processor (or controller).

FIG. 1 is a block diagram illustrating components of an example machine able to read instructions from a machine-readable medium and execute them in a processor (or controller). Specifically, FIG. 1 shows a diagrammatic representation of a machine in the example form of a computer system 100 within which instructions 124 (e.g., software) for causing the machine to perform any one or more of the methodologies discussed herein may be executed. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 124 (sequential or otherwise) that specify actions to be taken by that machine. Further, while only a single machine is illustrated, the term "machine" shall also be taken to include any collection of machines that individually or jointly execute instructions 124 to perform any one or more of the methodologies discussed herein.

The example computer system 100 includes a processor 102 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 104, and a static memory 106, which are configured to communicate with each other via a bus 108. The computer system 100 may further include graphics display unit 110 (e.g., a liquid crystal display (LCD), a projector, or a cathode ray tube (CRT)). The computer system 100 may also include alphanumeric input device 112 (e.g., a keyboard), a cursor control device 114 (e.g., a mouse, a trackball, a joystick, a motion sensor, or other pointing instrument), a storage unit 116, a signal generation device 118 (e.g., a speaker), and a network interface device 120, which also are configured to communicate via the bus 108.

The storage unit 116 includes a machine-readable medium 122 (e.g., non-transitory computer-readable storage medium) on which is stored instructions 124 (e.g., software) embodying any one or more of the methodologies or functions described herein. The instructions 124 (e.g., software) may also reside, completely or at least partially, within the main memory 104 or within the processor 102 (e.g., within a processor's cache memory) during execution thereof by the computer system 100, the main memory 104 and the processor 102 also constituting machine-readable media. The instructions 124 (e.g., software) may be transmitted or received over a network 126 via the network interface device 120.

While machine-readable medium 122 is shown in an example embodiment to be a single medium, the term "machine-readable medium" should be taken to include a single medium or multiple media (e.g., a centralized or distributed database, or associated caches and servers) able to store instructions (e.g., instructions 124). The term "machine-readable medium" shall also be taken to include any medium that is capable of storing instructions (e.g., instructions 124) for execution by the machine and that cause the machine to perform any one or more of the methodologies disclosed herein. The term "machine-readable medium" includes, but not be limited to, data repositories in the form of solid-state memories, optical media, and magnetic media.

Enhanced Digital Video Recording

In this disclosure, "digital data" generally refers to any machine-readable and machine-storable work product, such as videos, audio files, digital images and texts. The following discussion focuses on video data recording in a SSD based or hybrid SSD plus HDD digital video recording device. However, the techniques described below can also be used with other types of digital content in other types of digital video recording devices.

Figure 2:
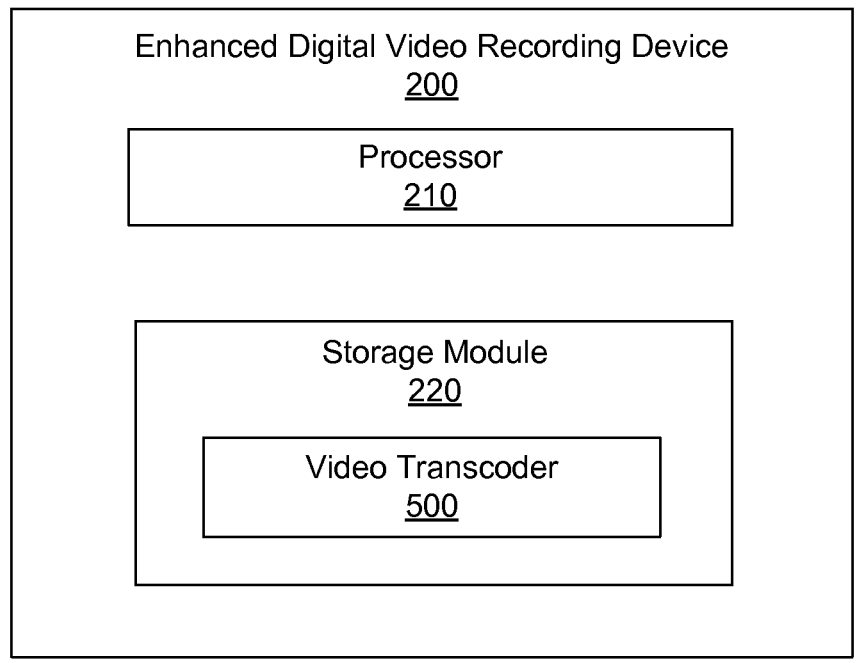
FIG. 2 illustrates an example of an enhanced digital video recording device (DVR) with video transcoding capabilities according to one embodiment.

FIG. 2 illustrates an example of an enhanced digital video recording device 200 with video transcoding capabilities according to one embodiment. In the embodiment illustrated in FIG. 2, the enhanced digital video recording device 200 has a processor 210 and a storage module 220, which integrates with a video transcoder 500. The enhanced digital video recording device 200 receives data packets of input data, processes each of the data packets by the processor 210, transcodes the data packets by the video transcoder 500 responsive to the input data being video data and stores the processed data packets in one or more memory units of the storage module 220. Other embodiments of the enhanced digital video recording device 200 include different and/or additional components. In addition, the functions may be distributed among the components in a different manner than described herein.

In one embodiment, the input data to the enhanced digital video recording device 200 is any type of digital data, such as video, audio or static images, or combination of multiple types of digital data. One example of the input data is a TV show and its associated audio data. The enhanced digital video recording device 200 is also configured to concurrently receive multiple streams of input data. Each stream of input data contains the data packets belonging to the corresponding input data. In one embodiment, the enhanced digital video recording device 200 concurrently receives up to 6 streams of input data. Other embodiments of the enhanced digital video recording device 200 can concurrently receive more than 6 streams of input data.

The processor 210 of the enhanced digital video recording device 200 is configured to receive one or more data packets of input data, process the received data packets and interact with the storage module 220 of the recording device 200. In one embodiment, the processor 210 analyzes the data packets of the input data and generates auxiliary information associated with the input data. The auxiliary information associated with the input data includes, e.g., data type of the input data, encryption information of the input data, identification of the input data, length of each data packet, locations of synchronization makers within a data packet and one or more counters associated with the data packets. The data type of the input data describes the type of the input data such as video, audio or other types of data. The encryption information indicates whether the input data is encrypted and how to regenerate encryption keys associated with the data packets.

In one embodiment, the processor 210 generates an auxiliary data file associated with each data packet of the input data. The auxiliary data file contains the auxiliary information associated with a data packet, such as the data type and encryption information on how to regenerate the encryption keys associated with the data packet. In the scenario of multiple data streams of input data, the processor 210 obtains the stream identification (ID) for each stream and associates the stream ID with the data packets of the input data represented by the stream. The processor 210 provides the auxiliary information associated with the data packets to the storage module 220 for further processing.

The storage module 220 of the enhanced digital video recording device 200 is configured to store the input data in one or more computer storage units and to process video input data by a video transcoder 500. In one embodiment, the storage module 220 is a hard disk drive (HDD), which includes a collection of computer disks to store digital data. In another embodiment, the storage module 220 is a solid state drive (SSD), which includes one or more computer memory chips to store digital data. In another embodiment, the storage module 220 is a hybrid of a solid state drive (SSD) plus a hard disk drive (HDD). Any mechanisms for storing digital data in computer memory known to those of ordinary skills in the art can be used by the storage module 220 to store the input data.

The video transcoder 500 is further described below with reference to FIG. 5 and FIG. 6.

Figure 3:
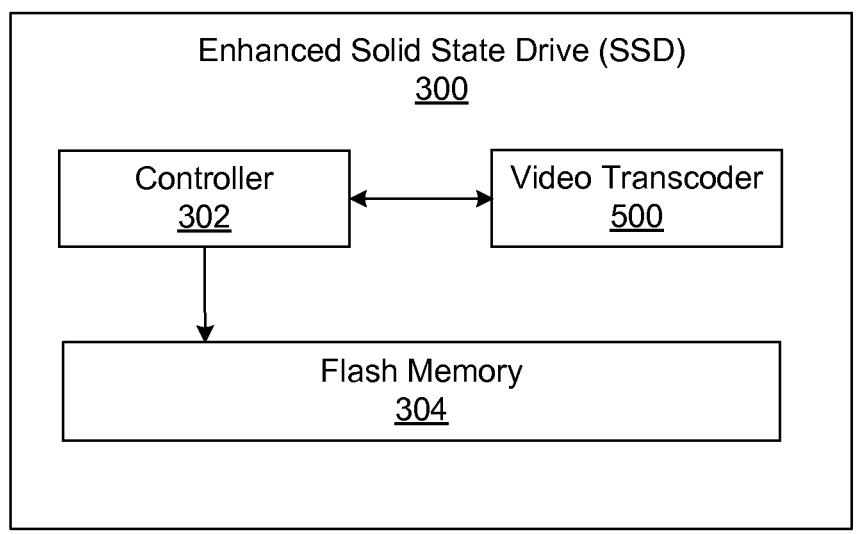
FIG. 3 illustrates an example of an enhanced SSD with a video transcoder according to one embodiment.

FIG. 3 is an example of the storage module 220 described above. The embodiment of the storage module 220 illustrated in FIG. 3 is implemented as an enhanced SSD 300, which includes a controller 302, a video transcoder 500 and a flash memory 304. The controller 302 is configured to provide an interface between the processor 210 of the enhanced digital video recording device 200 and the video transcoder 500 and an interface between the processor 210 and the flash memory 304.

To provide the interface between the processor 210 and the video transcoder 500, the controller 302 receives the auxiliary information associated with the data packets of the input data from the processor 210 and obtains the data type and data encryption information from the auxiliary information. Responsive to the input data being video data based on the analysis of the auxiliary information of the input data, the controller 302 instructs the video transcoder 500 to transcode the data packets of the input data.

Responsive to the input data being encrypted for security based on the analysis of the auxiliary information of the input data, the controller 302 instructs the video transcoder 500 to generate encryptions keys associated with the data packets of the input data using the encryption information. The video transcoder 500 decrypts the data packets using the generated encryption keys. After the decryption, the video transcoder 500 transcodes the decrypted data packets. By dedicating the controller 302 of the enhanced SSD to interface between the processor 210 and the video transcoder 500, the video transcoding capabilities can be seamlessly integrated into existing DVRs without modifying hardware components of the existing DVRs.

To provide the interface between the processor 210 and the flash memory 304, the controller 302 stores the input data in the flash memory 304, e.g., performing a series of memory read/write operations. In one embodiment, the input data is video data and the controller 302 instructs the video transcoder 500 to transcode the input data and stores the transcoded input data in the flash memory 304. In response to other types of input data, which do not need video transcoding by the video transcoder 500, or in response to the video transcoder 500 determining to skip the video data packets, the controller 302 stores the input data in the flash memory 304 without video transcoding.

The flash memory 304 of the enhanced SSD 300 is configured to store the raw input data or transcoded input data. In one embodiment, the flash memory 304 is a NAND flash array grouped into a series of fixed sized blocks (e.g., 128-byte blocks) suited for storing sequential data such as video frames and audio data. Other types of flash memory such as NOR flash memory can be readily used by the flash memory 304.

Figure 4:
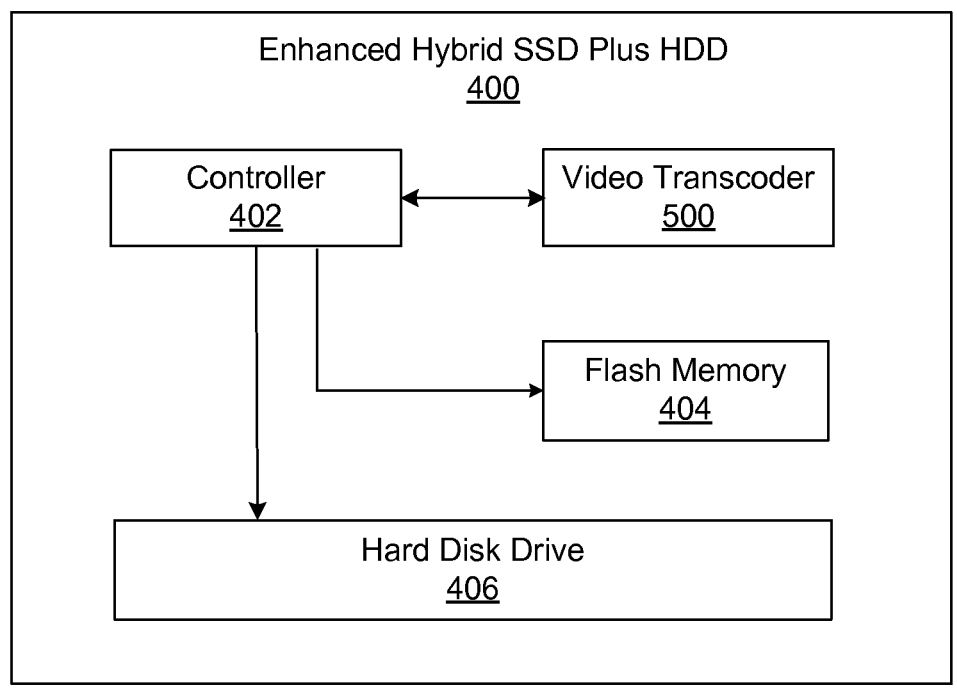
FIG. 4 illustrates an example of an enhanced hybrid SSD plus HDD with a video transcoder according to one embodiment.

FIG. 4 is another example of the storage module 220 described above. The embodiment of the storage module 220 illustrated in FIG. 4 is implemented as an enhanced hybrid SSD plus HDD 400, which includes a controller 402, a video transcoder 500, a flash memory 404 and an HDD 406. The controller 402 is configured to provide an interface between the processor 210 of the enhanced digital video recording device 200 and the video transcoder 500 and an interface between the processor 210, the flash memory 404 and the HDD 406.

The controller 402 in FIG. 4 stores video into the flash memory 404 just like FIG. 3 until the flash memory 404 is full, then the controller 402 copies all the video data from the flash memory 404 into the HDD 406. In one embodiment, the HDD 406 is only rarely used, the hybrid SSD plus HDD 400 acts like an SSD only solution with all the benefits, but with dramatic cost savings by reducing the size of the SSD.

Video Transcoding with Enhanced SSDs

Figure 5:
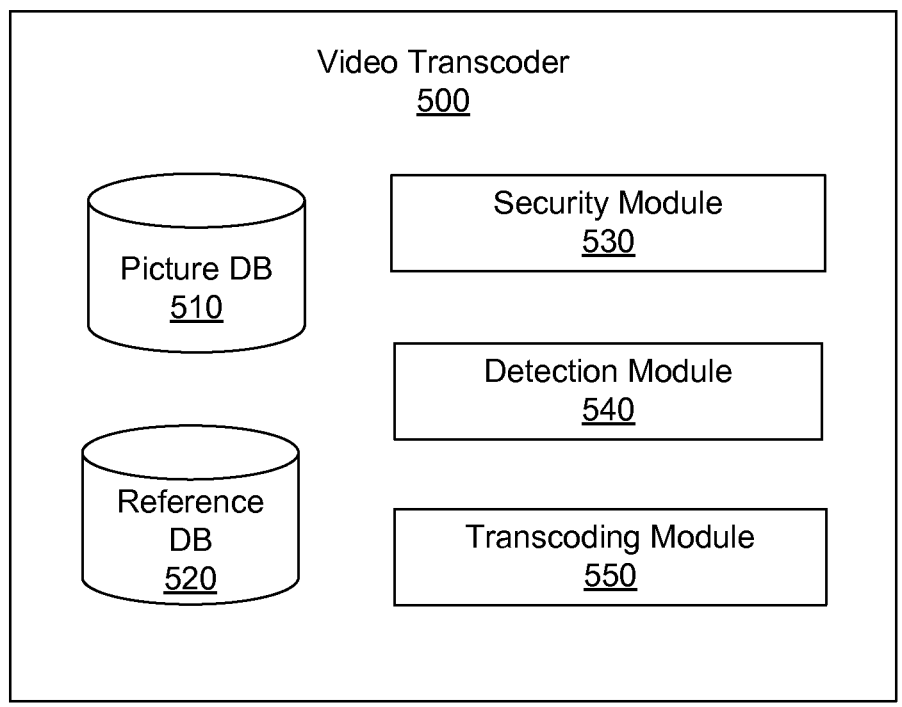
FIG. 5 is an example of video transcoder for enhancing the performance of digital video recording according to one embodiment.

FIG. 5 is an example of the video transcoder 500 for enhancing the performance of digital video recording according to one embodiment. The video transcoder 500 illustrated in FIG. 5 has a picture database 510, a reference database 520, a security module 530, a detection module 540 and a transcoding module 550. The video transcoder 500 receives one or more streams of input data, detects the presence of video data in the input data and transcodes the video data. In response to the input data being encrypted, the video transcoder 500 decrypts the video data before transcoding the video data.

In one embodiment, the video transcoder 500 receives a transport stream of input data comprising multiple data packets transmitted over a computer network. One example of the transport stream of the input data is a Moving Picture Experts Group (MPEG) transport stream for communicating or storing one or more programs of coded data according to known coding standards in environments in which errors such as bit value errors or loss of packets may occur.

The MPEG transport stream of the input data has one or more data packets and each data packet has a length and is defined by one or more packet layer syntax elements. Table I below illustrates example syntax elements of a data packet of a MPEG transport stream defined according to the coding standard ITU-T Rec. H.262. Example data packet of the transport stream is 188 bytes long and has the following syntax elements.

TABLE 1

Syntax Elements of Data Packets of a MPEG Transport Stream transport_packet( )
{
  sync_byte;
  transport_error_indicator;
  payload_unit_start_indicator;
  transport_priority;
  transport_scramling_control;
  PID;
  continuity_counter;
}

The sync_byte is a fixed 8-bit field whose value is "0100 0111" (0x47). The transport error indicator is a 1 bit flag, and when set to "1", it indicates that at least 1 uncorrectable bit error exits in the associated data packet. The PID is a 13-bit field, indicating the type of data stored in the packet payload. The continuity_counter is a 4-bit field incrementing with each data packet within the same PID.

The picture database 510 is configured to store pictures (also referred to as "video frames" or "frames") of video input data, such as TV shows, auxiliary information associated with the input data and statistics of the input data accumulated during transcoding process. In one embodiment, the auxiliary information associated with the input data includes type of the input data, e.g., video, audio, or static images, information indicating whether the input data is encrypted, identification of a transport stream representing the input data (e.g., PID of the transport stream), length of each data packet of the input data and other information describing the data packet and/or the input data. The statistics of the input data generated from transcoding the data packets of the input data include error rate of the transcoding, bitrate of the transcoding and other information associated with the transcoding.

The reference database 520 stores information describing video data packets coded according to known coding standards and transmission of the video data packets over a computer network. In one embodiment, the reference database 520 stores syntax elements of data packets of video transport streams coded in accordance with various coding standards, such as ITU-T Rec. H.262|ISO/IEC 131818-2 and ISO/IEC 13838-3. For example, for each video transport stream coded according to a particular coding standard, the reference database 520 stores a table of syntax elements for data packets of the transport stream associated with the particular coding standard.

The security module 530 is configured to determine whether the input data is encrypted. In one embodiment, the security module 530 receives encryption keys associated with data packets from a controller (e.g., the controller 302 of the enhanced SSD 300 illustrated in FIG. 3). In response of no encrypting keys available from the controller, the security module 530 interacts with the controller to obtain information regarding how to regenerate encryption keys associated with the input data. Upon receiving the encryption generation information such as encryption schemes (e.g., MD5, SHA-1) used for encrypting the data packets, the security module 530 generates the encryption keys associated with the data packets of the input data. Regenerating the encryption keys associated with data packets by the security module 530 enables the digital video recording device (e.g., the enhanced SSD 300 in FIG. 3) to reduce complexity of the controller of the recording device while providing the security of the input data.

The detection module 540 detects whether input data is video based on detection of syntax elements of a known coding standard used to code data packets of the input data. Taking a data packet coded in accordance with the ITU-T Rec. H.262|ISO/IEC 131818-2 and ISO/IEC 13838-3 coding standard, the detection module 550 detects whether the known syntax elements associated with the coding standard such as sync_byte, PID and continuity_counter are present in the data bytes of a data packet. A data packet coded in accordance with the ITU-T Rec. H.262|ISO/IEC 131818-2 and ISO/IEC 13838-3 coding standard starts with a sync_byte and the syntax element sync_byte has a known value "0100 0011" (0x47). To detect the start of the data packet, the detection module 540 reads the first data byte of the data packet that represents the syntax element sync_byte and compares the value of the data byte with the known value "0100 0011" (0x47). To find the start of next data packet, the detection module 540 reads the first byte after 188 bytes, which is the length of the previous data packet. The detection module 540 iteratively finds all the sync_byte for all data packets in the same transport stream representing the input data.

The detection module 540 similarly detects other known syntax elements of the data packets and based on the detection, the detection module 540 determines whether the data packet of the input data is video data. To reduce false detection of the video data in a data packet of the input data, the detection module 540 is further configured to check the detection based on analysis of other syntax elements associated with the data packet. For example, the detection module 540 analyzes the syntax element PID to determine whether the data packet belongs to a particular transport stream. For a digital video recording device supporting up to 4 transport streams, the detection module 540 ignores a fifth transport stream received by the recording device based on the PID analysis. Taking the syntax element continuity_counter as another example, the decoding module 540 marks a data packet as out of sequence in response to the continuity_counter element having a value larger than the maximum sequence number that can be assigned to a data packet.

Based on the analysis of the syntax elements associated with the data packets, the detection module 540 generates feedback data and interacts with the controller of the digital video recording device. In one embodiment, the feedback data include the identifications of the ignored transport streams and out of sequence data packets. The ignored transport stream is not transcoded and is stored in the memory of the digital video recording device. The out of sequence data packets are flagged for further investigation, including determining the appropriate transport streams to which the out of sequence data packets belong.

The transcoding module 550 is configured to transcode data packets that are determined to be video data by the detection module 540. Transcoding comprises decoding a source video from its native format into an unencoded representation or raw video pixels using a codec for the native format and then encoding the unencoded representation or raw pixels with a codec for another video format. Transcoding can include frame rate transcoding, bitrate transcoding, resolution transcoding or transcoding with different video coding standards. Transcoding can be used to reduce storage requirements, and also to reduce the bandwidth requirements for serving videos to clients. Any video transcoding schemes known to those of ordinary skills in the art can be used to transcode the video data by the transcoding module 550.

Figure 6:
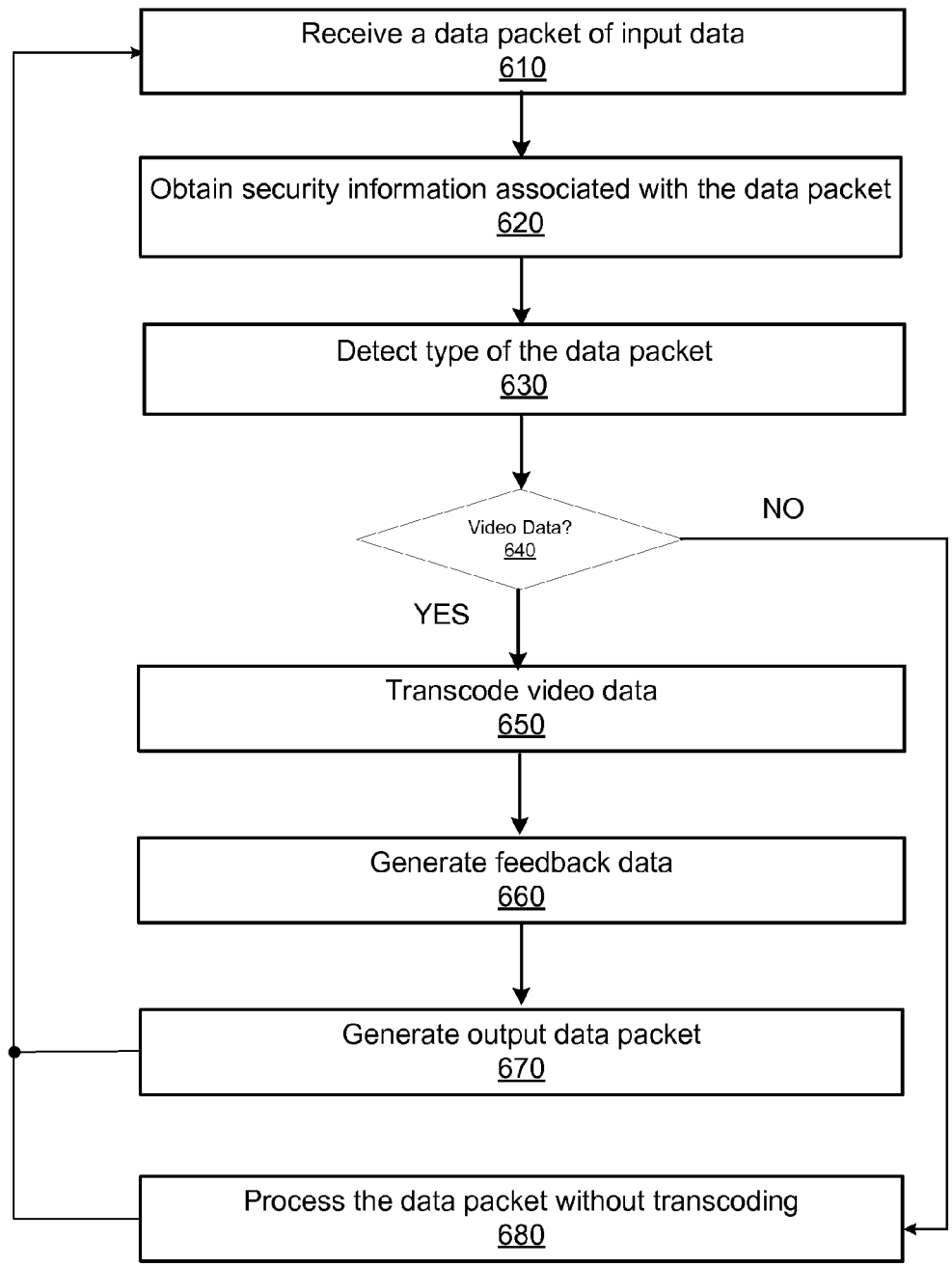
FIG. 6 is a flow chart of video transcoding in conjunction with digital video recording according to one embodiment.

FIG. 6 is a flow chart of video transcoding in conjunction with digital video recording according to one embodiment. Initially, the video transcoder 500 as illustrated in FIG. 5 receives 610 a data packet of input data and obtains 620 the security information associated with the data packet. In one embodiment, the security information of a data packet indicates whether the data packet is encrypted and the encryption keys used to encrypt the data packet. The video transcoder 500 can obtain the security information either from a controller of the digital video recording device or regenerate the encryption keys based on the auxiliary information associated with the data packet. The video transcoder 500 detects 630 the type of the data packet by determining whether the data packet is video data. In one embodiment, the video transcoder 500 detects the presence of one or more known syntax elements of a coding standard used to code the data packet.

Responsive to the data packet being video data 640, the video transcoder 500 transcodes 650 the video data according to the predetermined type of transcoding, e.g., resolution transcoding. Responsive to the data packet being encrypted, the video transcoder 500 decrypts the data packet before transcoding the data packet. The video transcoder 500 is also configured to generate 660 feedback data such as identification of out of sequence data packets and indication whether to skip the transcoding. The video transcoder 500 generates 670 an output data packet after transcoding and checks whether there are more data packets for processing. Responsive to more data packets for processing, the video transcoder 500 iterates through steps 610-670 described above to process the data packets. Responsive to the data packet not being video data, the video transcoder 500 processes the data packet without transcoding 680. In one embodiment, the process includes storing analysis of auxiliary information associate with the data packet and signaling the controller of the digital video recording device to store the data packet without transcoding.

Additional Configuration Considerations

The disclosed embodiments beneficially allow for a system and method for integrating a video transcoder within a storage module (e.g., HDD or SSD or hybrid SSD plus HDD) of a digital video recording device (e.g., a DVR) to provide enhanced digital video recording features and user experience. The video transcoder interacts with a controller of the storage device to differentiate between video data packets and non-video data packets of input data in real time (i.e., on the fly) based on one or more determination criteria. Responsive to the input data being video, the video transcoder transcodes the input data before the controller storing the input data into computer memory storage units of the digital video recording device.

By dedicating a controller of the enhanced SSD or enhanced hybrid SSD plus HDD to interface between a processor of the device and the video transcoder, the video transcoding capabilities can be seamlessly integrated into existing DVRs without modifying hardware components of the existing DVRs. Improved digital video recording performance from disclosed integration is particularly useful for lowering power consumption, increasing mean time between failures (MTBF), reducing or eliminating noise and vibration and lowering cost for DVRs with SSDs.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods may be performed, at least partially, by one or more processors, e.g., 102, that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented, e.g., processor 102. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors, e.g., 102, may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory 104). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for improving coding efficiency of compression with internal bit depth increase through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A digital video recording device for recording digital data, the device comprising:
 a processor configured to receive a plurality of data streams, each data stream comprising a plurality of data packets; and
 a storage module configured to store the plurality of data streams, the storage module comprising:
  one or more computer memory storage units comprising flash memory,
  a video transcoder, and
  a controller coupled to the processor, the one or more computer memory storage units, and the video transcoder, wherein
  the video transcoder is configured to:
   receive a data packet of one of the plurality of data streams from the processor via the controller,
   detect whether one or more syntax elements are present in the data packet, wherein the one or more syntax elements are associated with a particular coding standard of a plurality of coding standards,
   determine that the data packet includes video data in response to a detection of the one or more syntax elements being present in the data packet, and
   transcode the video data to produce transcoded video data, and
  the controller is configured to store the transcoded video data in the flash memory.

2. The device of claim 1, wherein the video transcoder is further configured to compare a syntax element value present in the data packet with a known syntax element value associated with the particular coding standard.

3. The device of claim 1, wherein at least one data stream of the plurality of data streams comprises a plurality of video data packets.

4. The device of claim 1, wherein the processor is further configured to:
 generate auxiliary information associated with data packets of a data stream; and
 provide the auxiliary information associated with the data packets of the data stream to the storage module.

5. The device of claim 4, wherein the auxiliary information associated with a data packet of the data stream comprises at least one of:
 data type of the data packet;
 encryption information of the data packet, the encrypting information including an indication on whether the data packet is encrypted and information on generating one or more encryption keys used to encrypt the data packet;

identification of data stream having the data packet;

length of the data packet;

locations of synchronization markers within the data packet; and a plurality of counters associated with the data packet.

6. The device of claim 5, wherein the data type comprises at least one of video, audio, images, and non-multimedia data types.

7. The device of claim 1, wherein the video transcoder is further configured to:

responsive to the data packet being encrypted:
generate one or more encryption keys associated with the data packet;
decrypt the data packet using the one or more encryption keys to produce a decrypted data packet; and
transcode the decrypted data packet.

8. The device of claim 1, wherein the video transcoder further configured to:

generate feedback data associated with data packets in the data stream; the feedback data describing statistics generated during transcoding the video data in the data stream.

9. The device of claim 1, wherein the processor is configured to receive the plurality of data streams concurrently.

10. The device of claim 1, wherein the one or more computer memory storage units comprises a solid state drive (SSD).

11. The device of claim 1, wherein the one or more computer memory storage units comprises a hard disk drive (HDD).

12. The device of claim 1, wherein the controller is further configured to store the plurality of data streams in the flash memory.

13. A non-transitory computer-readable storage medium configured to store computer program instructions that, when executed by at least one processor, are configured to cause the at least one processor to perform a method comprising:

receiving a plurality of data streams, by a digital video recording device, each data stream comprising a plurality of data packets;

detecting whether one or more syntax elements are present in a data packet of one of the plurality of data streams, wherein the one or more syntax elements are associated with a particular coding standard of a plurality of coding standards;

determining that the data packet includes video data in response to a detection of the one or more syntax elements being present in the data packet;

transcoding the video data to produce transcoded video data; and storing the transcoded video data in flash memory of the digital video recording device.

14. The computer-readable storage medium of claim 13, wherein the detecting comprises:

comparing a syntax element value present in the data packet with a known syntax element value associated with the particular coding standard.

15. The computer-readable storage medium of claim 13, wherein at least one data stream of the plurality of data streams comprises a plurality of video data packets.

16. The computer-readable storage medium of claim 13, wherein the method further comprises:

generating auxiliary information associated with data packets of a data stream; and storing the generated auxiliary information associated with the data packets of the data stream in the flash memory.

17. The computer-readable storage medium of claim 16, wherein the auxiliary information associated with a data packet of the data stream comprises at least one of:

data type of the data packet;

encryption information of the data packet, the encrypting information including an indication on whether the data packet is encrypted and information on generating one or more encryption keys used to encrypt the data packet;

identification of data stream having the data packet;

length of the data packet;

locations of synchronization markers within the data packet; and a plurality of counters associated with the data packet.

18. The computer-readable storage medium of claim 17, wherein the data type comprises at least one of video, audio, images, and non-multimedia data types.

19. The computer-readable storage medium of claim 13, wherein the method further comprises:

responsive to the data packet being encrypted:
generating one or more encryption keys associated with the data packet;
decrypting the data packet using the one or more encryption keys to produce a decrypted data packet; and
transcoding the decrypted data packet.

20. The computer-readable storage medium of claim 13, wherein the method further comprises:

generating feedback data associated with data packets in the data stream; the feedback data describing statistics generated during transcoding the video data.

* * * * *